(12) United States Patent
Haque et al.

(10) Patent No.: US 8,087,924 B2
(45) Date of Patent: Jan. 3, 2012

(54) INJECTION MOLDING NOZZLE HAVING A TIP RETAINER MOVABLE RELATIVE TO A NOZZLE HOUSING

(75) Inventors: Zakiul Haque, Essex, VT (US); Daniel Hontheim, Bettingen (DE); Udo Schwarzkopf, Trierweiler (DE); Abdeslam Bouti, Swanton, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 47 days.

(21) Appl. No.: 12/835,821

(22) Filed: Jul. 14, 2010

(65) Prior Publication Data

US 2010/0278964 A1 Nov. 4, 2010

Related U.S. Application Data

(63) Continuation-in-part of application No. 11/956,742, filed on Dec. 14, 2007, now abandoned.

(60) Provisional application No. 60/887,391, filed on Jan. 31, 2007.

(51) Int. Cl.
*B29C 45/20* (2006.01)

(52) U.S. Cl. .............. 425/549; 264/328.9; 425/574
(58) Field of Classification Search .............. 425/549, 425/562, 574; 264/328.9
See application file for complete search history.

(56) References Cited

U.S. PATENT DOCUMENTS

| | | | |
|---|---|---|---|
| 6,609,902 B1 | 8/2003 | Blais et al. | |
| 6,726,467 B1 | 4/2004 | Lefebure | |
| 6,971,868 B2 | 12/2005 | Ciccone | |
| 7,143,496 B2 | 12/2006 | Guenther | |
| 7,891,969 B2 * | 2/2011 | Olaru | 425/549 |
| 2005/0118298 A1 | 6/2005 | Babin et al. | |
| 2008/0206391 A1 * | 8/2008 | Bouti et al. | 425/542 |
| 2008/0206394 A1 * | 8/2008 | Bouti | 425/549 |
| 2008/0274229 A1 * | 11/2008 | Barnett | 425/568 |
| 2009/0148550 A1 * | 6/2009 | Mohammed | 425/549 |
| 2011/0101567 A1 * | 5/2011 | Weatherall | 264/328.9 |

* cited by examiner

*Primary Examiner* — Timothy Heitbrink

(57) ABSTRACT

An injection nozzle assembly, comprising: a nozzle housing; a nozzle tip having an inlet portion being contactable with the nozzle housing; and a tip retainer being movable relative to the nozzle housing between a first position, a second position and a third position.

5 Claims, 16 Drawing Sheets

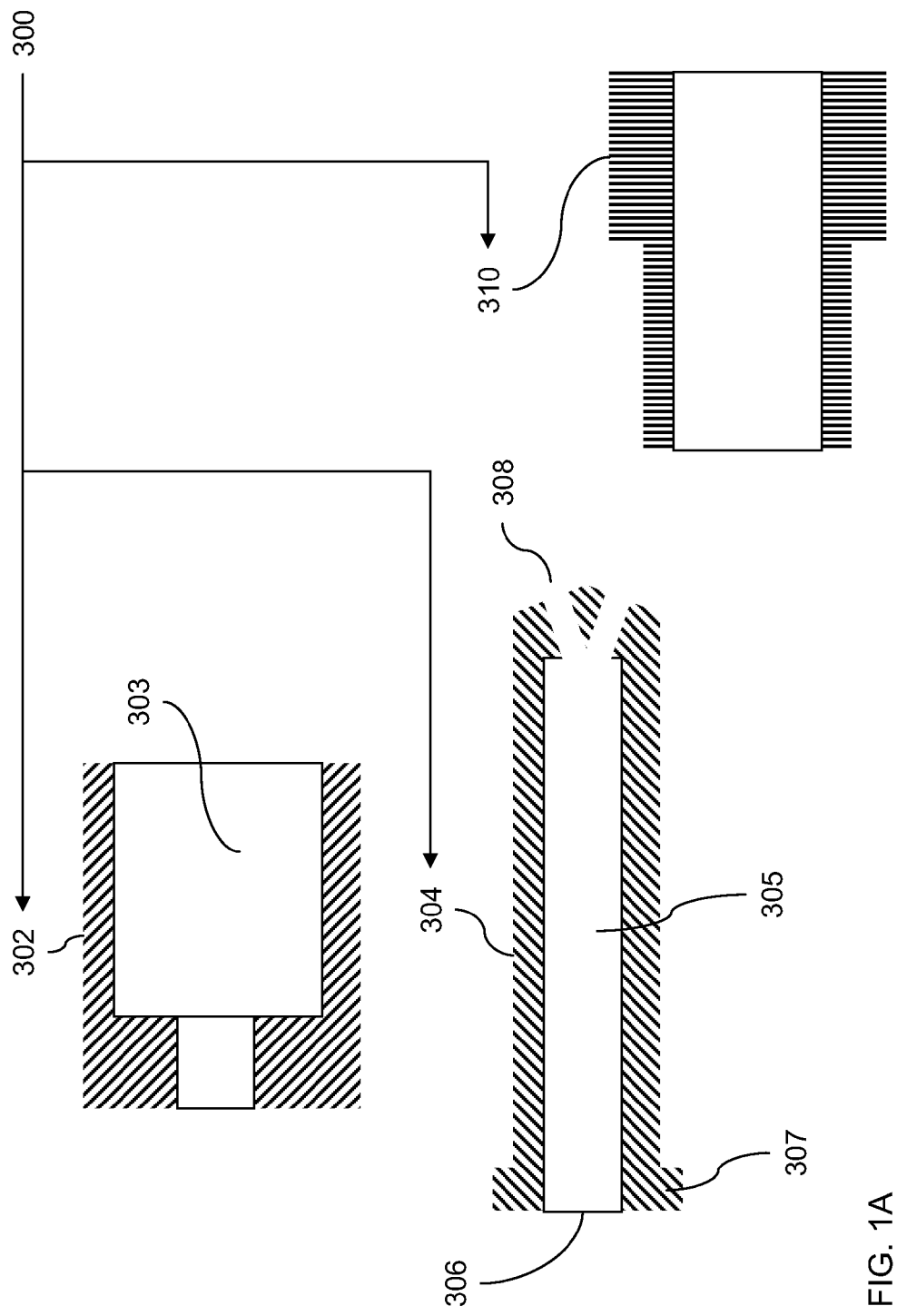

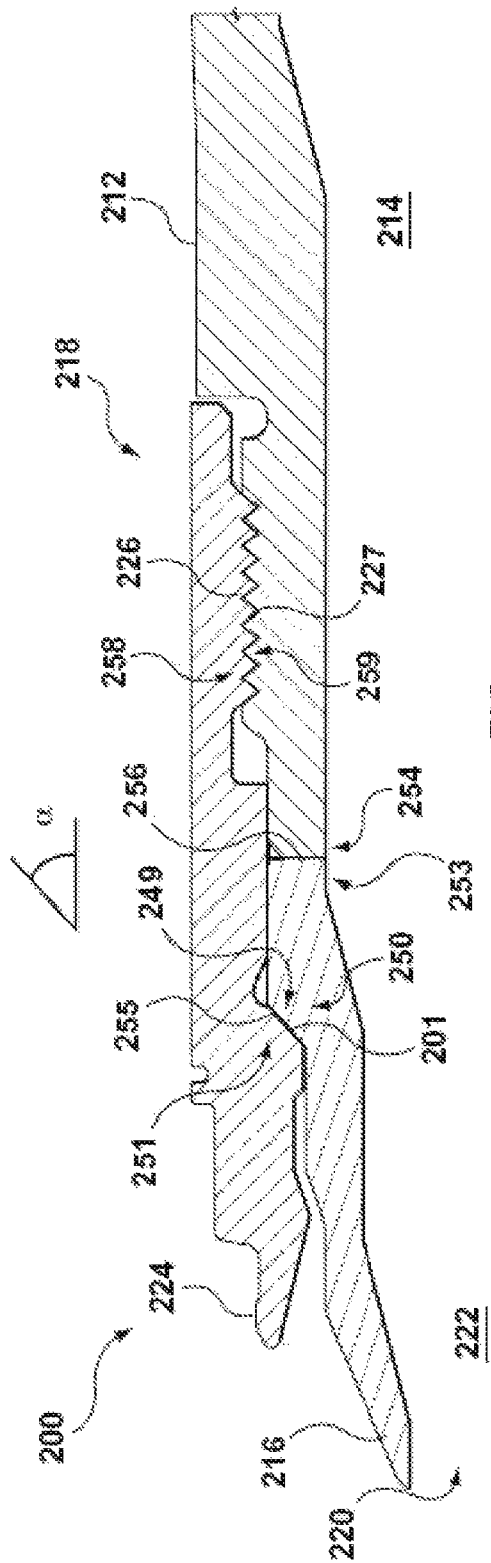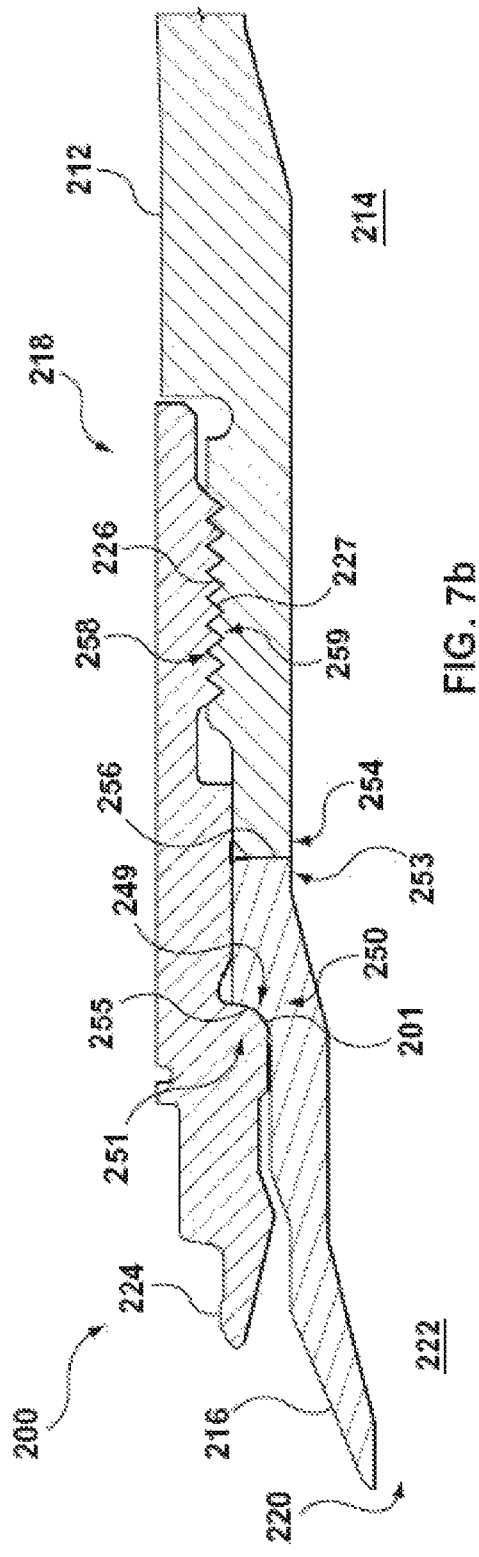

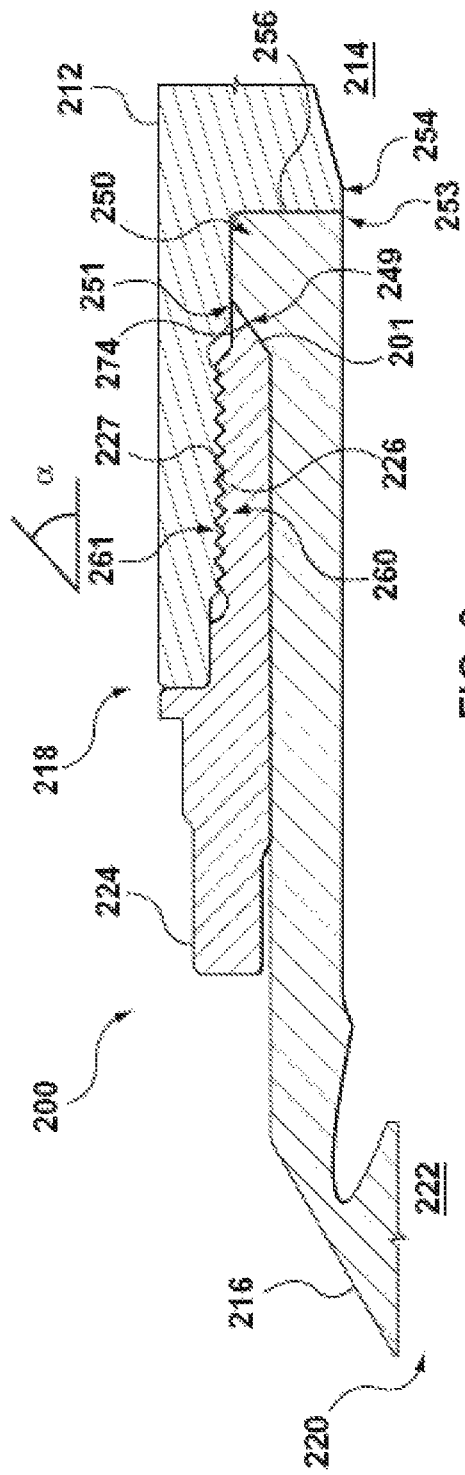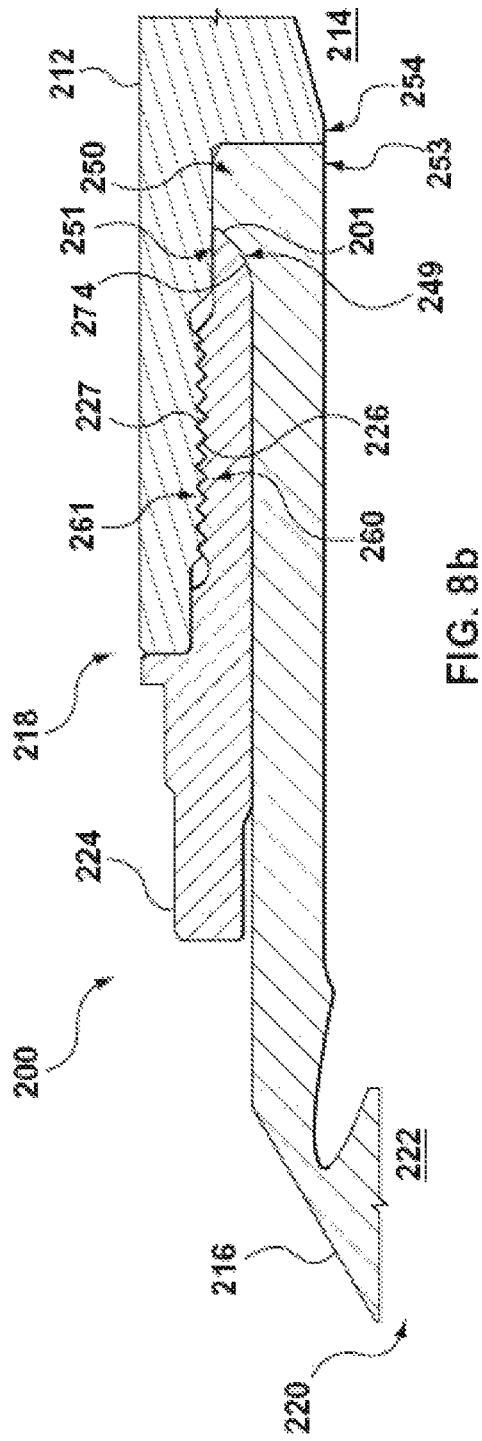

INJECTION MOLDING NOZZLE HAVING A TIP RETAINER MOVABLE RELATIVE TO A NOZZLE HOUSING

CROSS REFERENCE TO RELATED PATENT APPLICATION

This patent application is a continuation in part patent application of prior U.S. patent application Ser. No. 11/956,742, filed Dec. 14, 2007, now abandoned, which claims benefit to the U.S. provisional Patent Application No. 60/887,391, filed Jan. 31, 2007 which is abandoned.

TECHNICAL FIELD

The present disclosure relates to molding systems and, more particularly, relates to nozzles for use with injection molding systems.

BACKGROUND

The first man-made plastic was invented in Britain in 1851 by Alexander PARKES. He publicly demonstrated it at the 1862 International Exhibition in London, calling the material Parkesine. Derived from cellulose, Parkesine could be heated, molded, and retain its shape when cooled. It was, however, expensive to produce, prone to cracking, and highly flammable. In 1868, American inventor John Wesley HYATT developed a plastic material he named Celluloid, improving on PARKES' invention so that it could be processed into finished form. HYATT patented the first injection molding machine in 1872. It worked like a large hypodermic needle, using a plunger to inject plastic through a heated cylinder into a mold. The industry expanded rapidly in the 1940s because World War II created a huge demand for inexpensive, mass-produced products. In 1946, American inventor James Watson HENDRY built the first screw injection machine. This machine also allowed material to be mixed before injection, so that colored or recycled plastic could be added to virgin material and mixed thoroughly before being injected. In the 1970s, HENDRY went on to develop the first gas-assisted injection molding process.

Injection molding machines consist of a material hopper, an injection ram or screw-type plunger, and a heating unit. They are also known as presses, they hold the molds in which the components are shaped. Presses are rated by tonnage, which expresses the amount of clamping force that the machine can exert. This force keeps the mold closed during the injection process. Tonnage can vary from less than five tons to 6000 tons, with the higher figures used in comparatively few manufacturing operations. The total clamp force needed is determined by the projected area of the part being molded. This projected area is multiplied by a clamp force of from two to eight tons for each square inch of the projected areas. As a rule of thumb, four or five tons per square inch can be used for most products. If the plastic material is very stiff, it will require more injection pressure to fill the mold, thus more clamp tonnage to hold the mold closed. The required force can also be determined by the material used and the size of the part, larger parts require higher clamping force. With Injection Molding, granular plastic is fed by gravity from a hopper into a heated barrel. As the granules are slowly moved forward by a screw-type plunger, the plastic is forced into a heated chamber, where it is melted. As the plunger advances, the melted plastic is forced through a nozzle that rests against the mold, allowing it to enter the mold cavity through a gate and runner system. The mold remains cold so the plastic solidifies almost as soon as the mold is filled. Mold assembly or die are terms used to describe the tooling used to produce plastic parts in molding. The mold assembly is used in mass production where thousands of parts are produced. Molds are typically constructed from hardened steel, etc. Hot-runner systems are used in molding systems, along with mold assemblies, for the manufacture of plastic articles. Usually, hot-runners systems and mold assemblies are treated as tools that may be sold and supplied separately from molding systems.

SUMMARY OF THE INVENTION

The inventor has researched a problem associated with known molding systems that inadvertently manufacture bad-quality molded articles or parts. After much study, the inventors believe they have arrived at an understanding of the problem and its solution, which are stated below, and the inventors believe this understanding is not known to the public. The following problems have been identified with know injection molding nozzles: (i) no control of pre-load applied on a tip insert flange, (ii) all pre-load force is directly transferred to a tip insert flange, (iii) a variable load is applied on a tip insert flange, (iv) an overload force can cause flange failure (static and fatigue).

According to one aspect, there is provided an injection nozzle assembly, comprising: a nozzle housing; a nozzle tip having an inlet portion being contactable with the nozzle housing; and a tip retainer being movable relative to the nozzle housing between a first position, a second position and a third position.

Other aspects and features of the non-limiting embodiments will now become apparent to those skilled in the art upon review of the following detailed description of the non-limiting embodiments with the accompanying drawings.

BRIEF DESCRIPTION OF THE DRAWINGS

These and other features and advantages of the present disclosure will be better understood by reading the following detailed description, taken together with the drawings wherein:

FIGS. 1A, 1B, 1C, 1D, 1E, 1F, 1G depict a cross section of an example of an injection nozzle assembly;

FIG. 7*a* is a partial, cross-sectional view of another embodiment of a nozzle according to the present disclosure having a linear or constant frustoconical shaped interface;

FIG. 7*b* is a partial, cross-sectional view of the nozzle shown in FIG. 7*a* having a non-linear, arcuate, or radiused shaped interface according to the present disclosure;

FIG. 8*a* is a partial, cross-sectional view of another embodiment of a nozzle according to the present disclosure having a linear or constant frustoconical shaped interface;

FIG. 8*b* is a partial, cross-sectional view of the nozzle shown in FIG. 8*a* having a non-linear, arcuate, or radiused shaped interface according to the present disclosure FIG. 9b is a close-up of the tapered interface having both a non-linear, arcuate, or radiused shaped interface and a linear or constant frustoconical shaped interface as shown in FIG. 9a.

DETAILED DESCRIPTION OF THE PREFERRED EMBODIMENT(S)

Figure 1B:
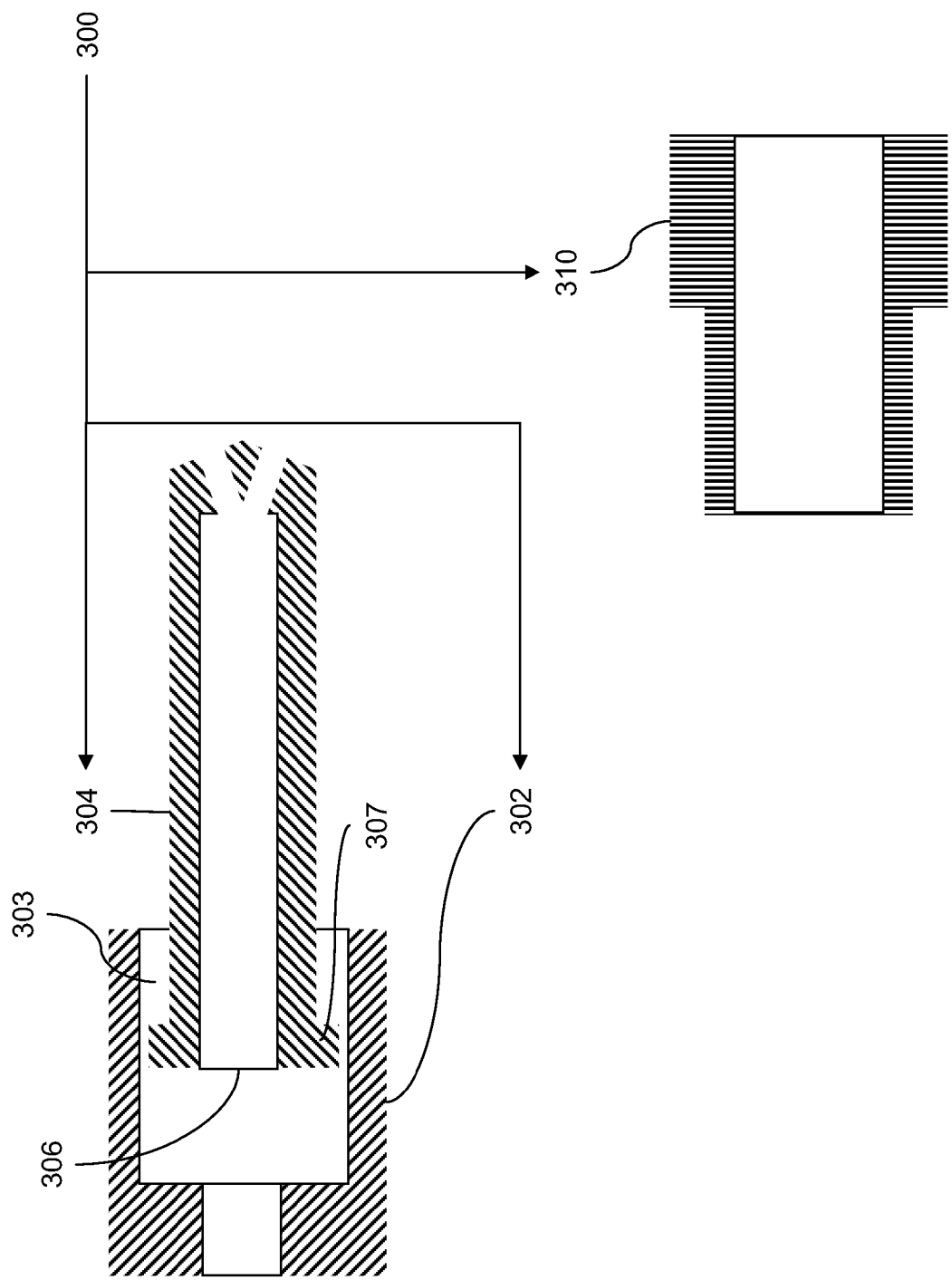

FIGS. 1A, 1B, 1C, 1D, 1E, 1F, 1G depict the cross section of an example of an injection nozzle assembly (300).

FIG. 1A depicts an exploded view of the injection nozzle assembly (300) in an unassembled state; that is, the parts and components of the injection nozzle assembly (300) are not yet in an assembled state, as described below in association with FIG. 1E. The injection nozzle assembly (300) includes (but is not limited to): (i) a nozzle housing (302), (ii) a nozzle tip (304), and (iii) a tip retainer (310). The nozzle housing (302) may define a nozzle recess (303). The nozzle tip (304) has an inlet portion (306) and also has an outlet portion (308). The inlet portion (306) may include a flange (307), which is optional. The nozzle tip (304) may be received in the nozzle recess (303) (that is, another embodiment contemplates the nozzle tip (304) not being received in the nozzle recess (303). The nozzle tip (304) defines a melt channel (305) that extends from the inlet portion (306) to the outlet portion (308). The inlet portion (306) is contactable with the nozzle housing (302) in the nozzle recess (303). The tip retainer (310) is connectable to the nozzle housing (302), as described further below in association with FIG. 1C. The tip retainer (310) is, generally speaking, movable relative to the nozzle housing (302). The tip retainer (310) is configured to transfer a preload force (400) to the inlet portion (306) of the nozzle tip (304) and to the nozzle housing (302), as described below in association with FIG. 1E. The tip retainer (310) is movable relative to the nozzle housing (302) between a first position (as depicted in FIG. 1D), a second position (as depicted in FIG. 1E) and a third position (as depicted in FIG. 1F).

Figure 1C:
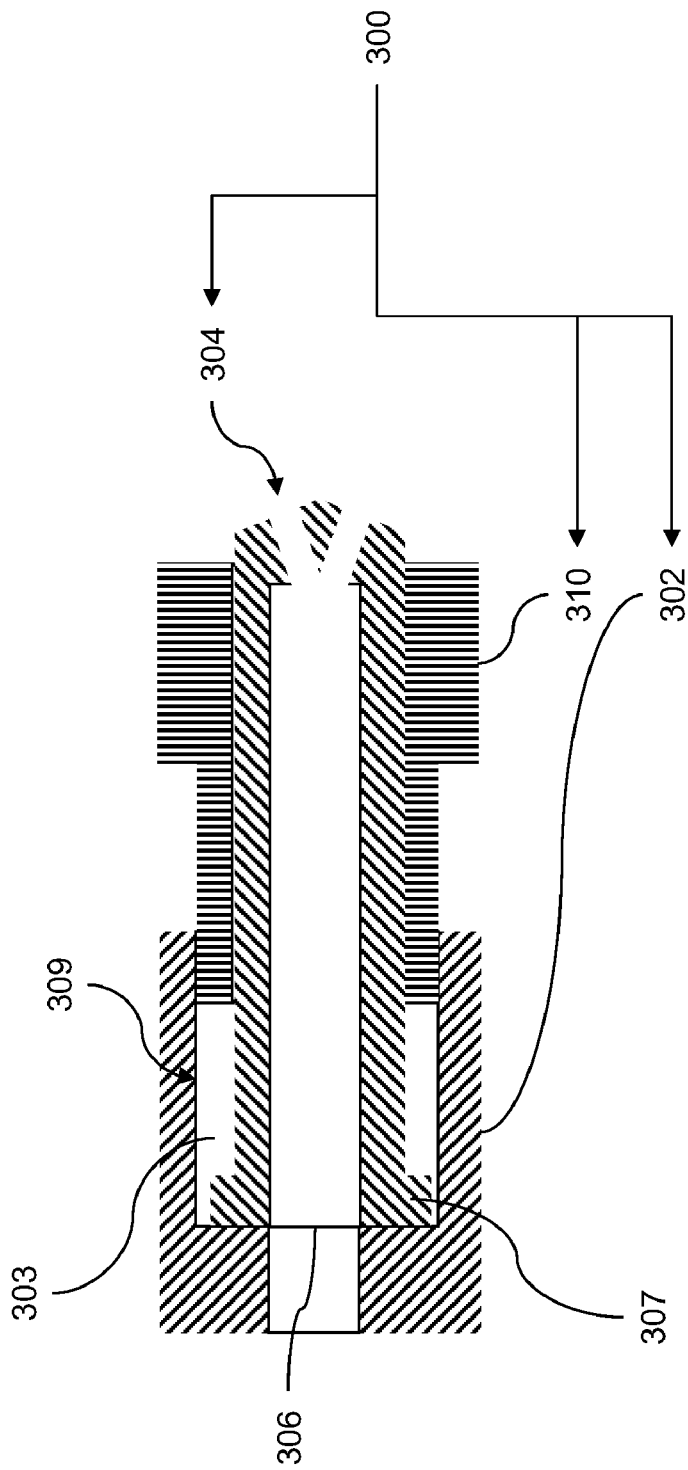

FIG. 1B depicts the nozzle tip (304) being slidably received in the nozzle recess (303) of the nozzle housing (302), so that eventually, the inlet portion (306), or the flange (307), makes contact with the nozzle housing (302), as depicted in FIG. 1C.

FIG. 1C depicts the tip retainer (310) being connected to the nozzle housing (302), and more specifically, being rotatably connected by way of threads (309) to the nozzle housing (302) within the nozzle recess (303). The threads (309) provide rotatable translation of the tip retainer (310) relative to the nozzle housing (302). The tip retainer (310) is rotated until the tip retainer (310) eventually makes contact with the inlet portion (306), or the flange (307), as described below in connection with FIG. 1D.

Figure 1D:
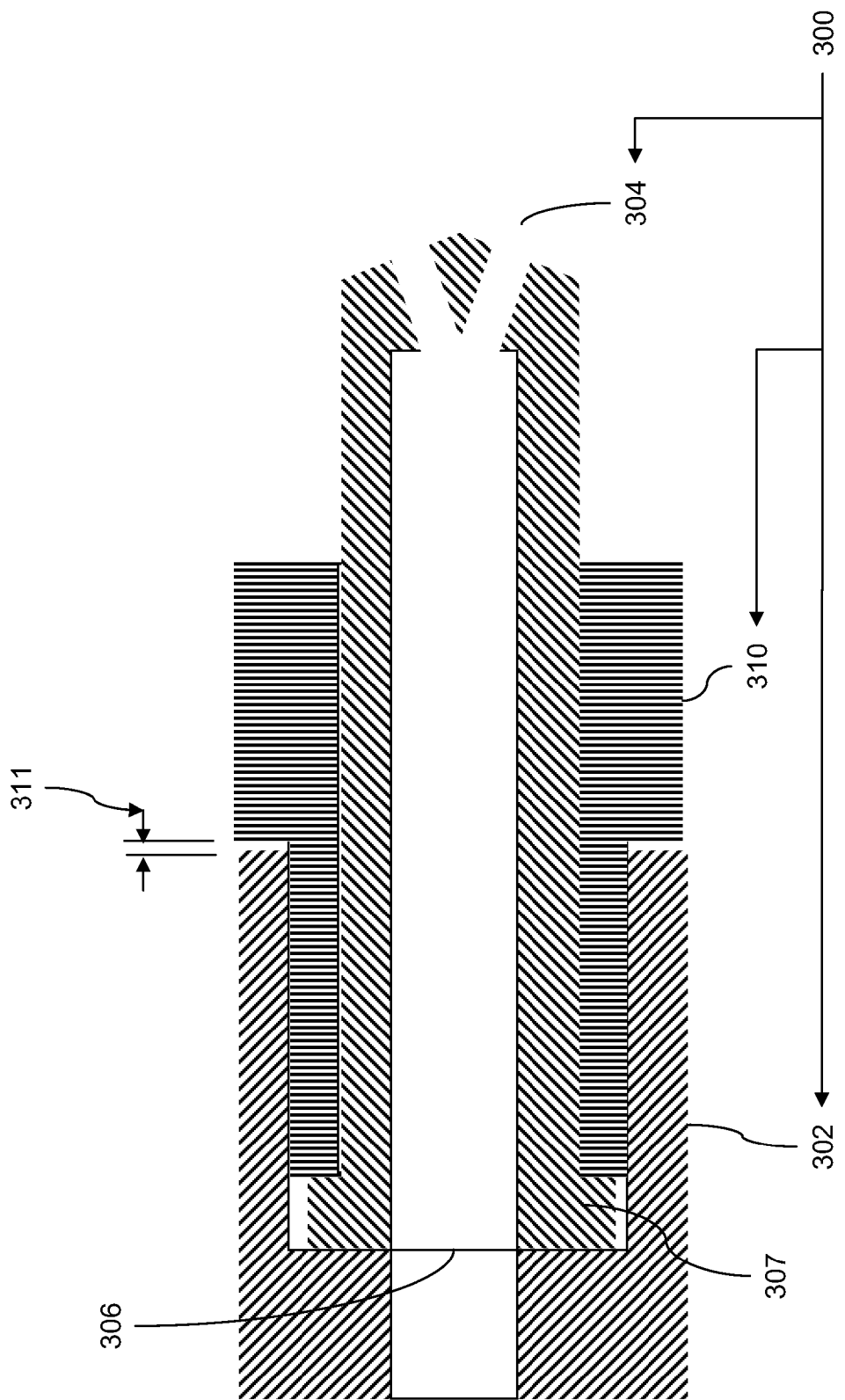
Figure 1E:
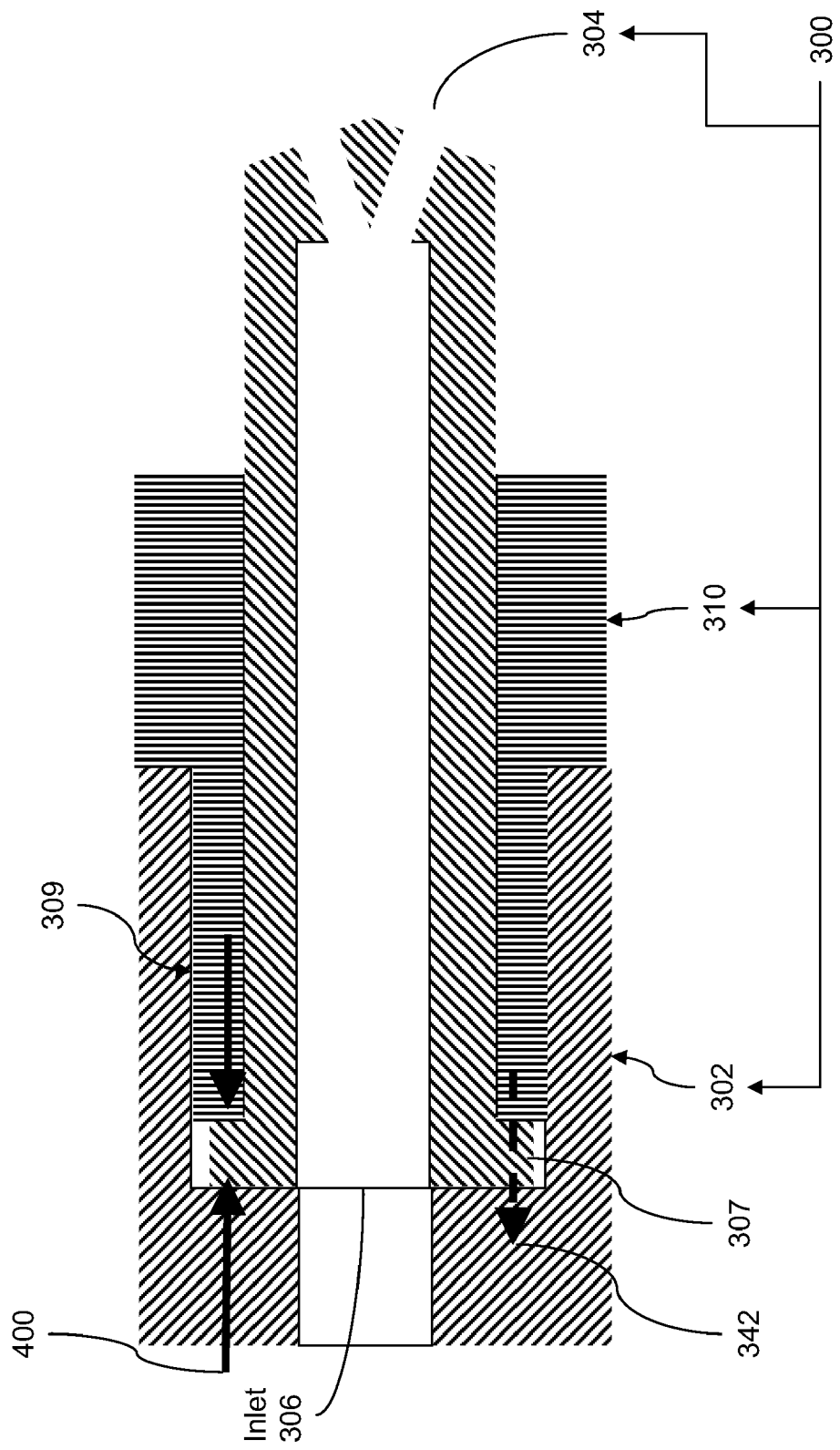
Figure 1F:
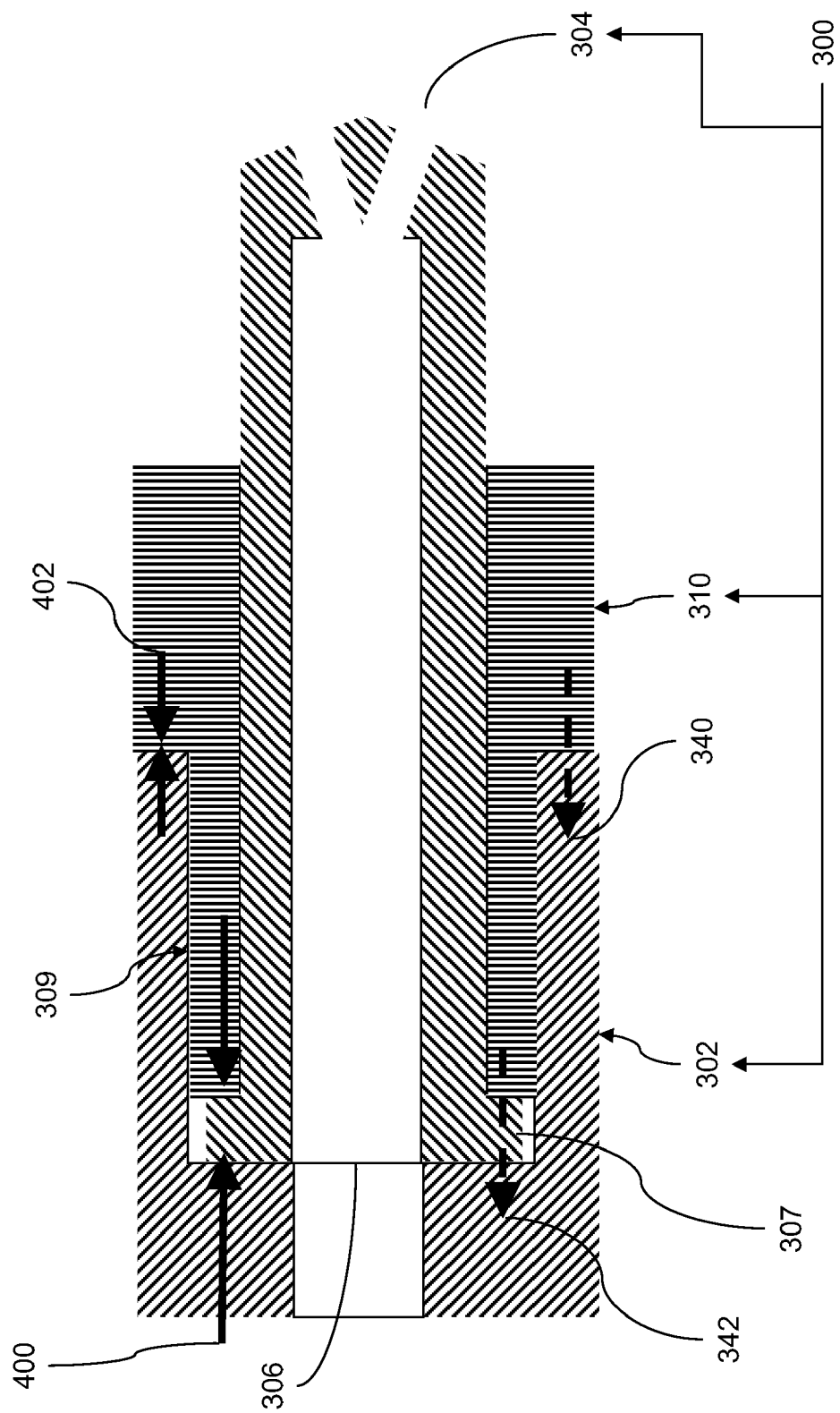

FIG. 1D depicts the tip retainer (310) positioned at the first position. The tip retainer (310) is movable relative to the nozzle housing (302) between the first position, the second position (as depicted in FIG. 1E) and the third position (as depicted in FIG. 1F) In the first position, the tip retainer (310) makes contact with the inlet portion (306), or the flange (307). Once contact is made between the tip retainer (310) with the inlet portion (306), a gap (311) is defined between the tip retainer (310) and the nozzle housing (302). As depicted in FIG. 1D, the tip retainer (310) is not yet rotated so as to apply a load (force) to the inlet portion (306) or the flange (307) at this time. It will be appreciated that FIG. 1D depicts the injection nozzle assembly (300) in a partially assembled position. In the first position, the tip retainer (310) is in contact with the nozzle tip (304) and also is set apart from the nozzle housing (302). In the first position, a force is not transferred from the tip retainer (310) to the nozzle tip (304).

FIG. 1E depicts the tip retainer (310) positioned at the second position. In the second position, the tip retainer (310) contacts the nozzle housing (302) without transmission of force from the tip retainer (310) to the nozzle housing (302). In addition, the tip retainer (310) is forcefully connected with the inlet portion (306), or the flange (307), of the nozzle tip (304) via a first force-transmission path (342). In response to the above arrangement, a pre-load force (400) becomes transmitted from the tip retainer (310) to the inlet portion (306). Specifically, the retainer (310) is further rotated so as to compress the inlet portion (306) or the flange (307) while the gap (311) (as depicted in FIG. 1D) becomes smaller and eventually the gap (311) disappears as a result of the tip retainer (310) making contact with the nozzle housing (302). In the second position, the tip retainer (310) does not make forcible contact with the nozzle housing (302). In the second position, this condition provides just the right amount of the pre-load force (400) to the inlet portion (306) or the flange (307) for sealing the inlet portion (306) with the nozzle housing (302).

FIG. 1F depicts the tip retainer (310) positioned at the third position. In the third position, the tip retainer (310) is forcefully connected with the inlet portion (306) of the nozzle tip (304) via the first force-transmission path (342). The tip retainer (310) is forcefully connected with the nozzle housing (302) via a second force-transmission path (340). In response to the above arrangement, the pre-load force (400) becomes sharable transmitted from the tip retainer (310) to the inlet portion (306) and to the nozzle housing (302) via the first force-transmission path (342) and the second force-transmission path (340). That is, the pre-load force (400) is shared over the first force-transmission path (342) and the second force-transmission path (340). An advantage of the third position is: (a) transfer of excessive preload force from the tip retainer (310) to the nozzle housing (302) that may be caused by accidental or inadvertent rotation of the tip retainer (310) hence avoiding application of accidental excessive preload force to the inlet portion (306) or the flange (307), and/or (b) most of the injection pressure load is transferred between the tip retainer (310) and the nozzle housing (302) hence less alternating load or forces may be experienced on the inlet portion (306) or the flange (307).

The inlet portion or the flange is a weak location of failure due to excessive load. Some known nozzles are constructed such that there is always a gap between tip retainer and the nozzle housing after final assembly, and then any further rotation of the tip retainer (that is, an over torque condition, etc) may produce excessive preload force that may act on the inlet portion or the flange of these known nozzles. The arrangement of FIG. 1F reduces the negative issues associated with the known nozzles. The inlet portion (306) or the flange (307) becomes compressed because the nozzle tip (304) includes a copper alloy that is relatively soft and may be compressed as the tip retainer (310) continues to be rotatable translated into the nozzle recess (303) of the nozzle housing (302). Once or after the tip retainer (310) contacts both the nozzle housing (302) and the inlet portion (306) or the flange (307), the tip retainer (310) transfers the pre-load force (400) to the inlet portion (306) (or the flange (307) of the nozzle tip (304) and to the nozzle housing (302). There are two paths of transmission for the pre-load force (400) to traverse: the second force-transmission path (340) from the tip retainer (310)

to the nozzle housing (302), and the second force-transmission path (342) from the tip retainer (310) to the inlet portion (306) or the flange (307) of the nozzle tip (304). Each path shares some of the pre-load force (400). A technical effect of the above arrangement is that the amount of the pre-load force (400) that is transmitted to the inlet portion (306) or the flange (307) is kept at a relatively smaller amount of force, which avoids over compressing (over straining) the inlet portion (306) or the flange (307).

Figure 1G:
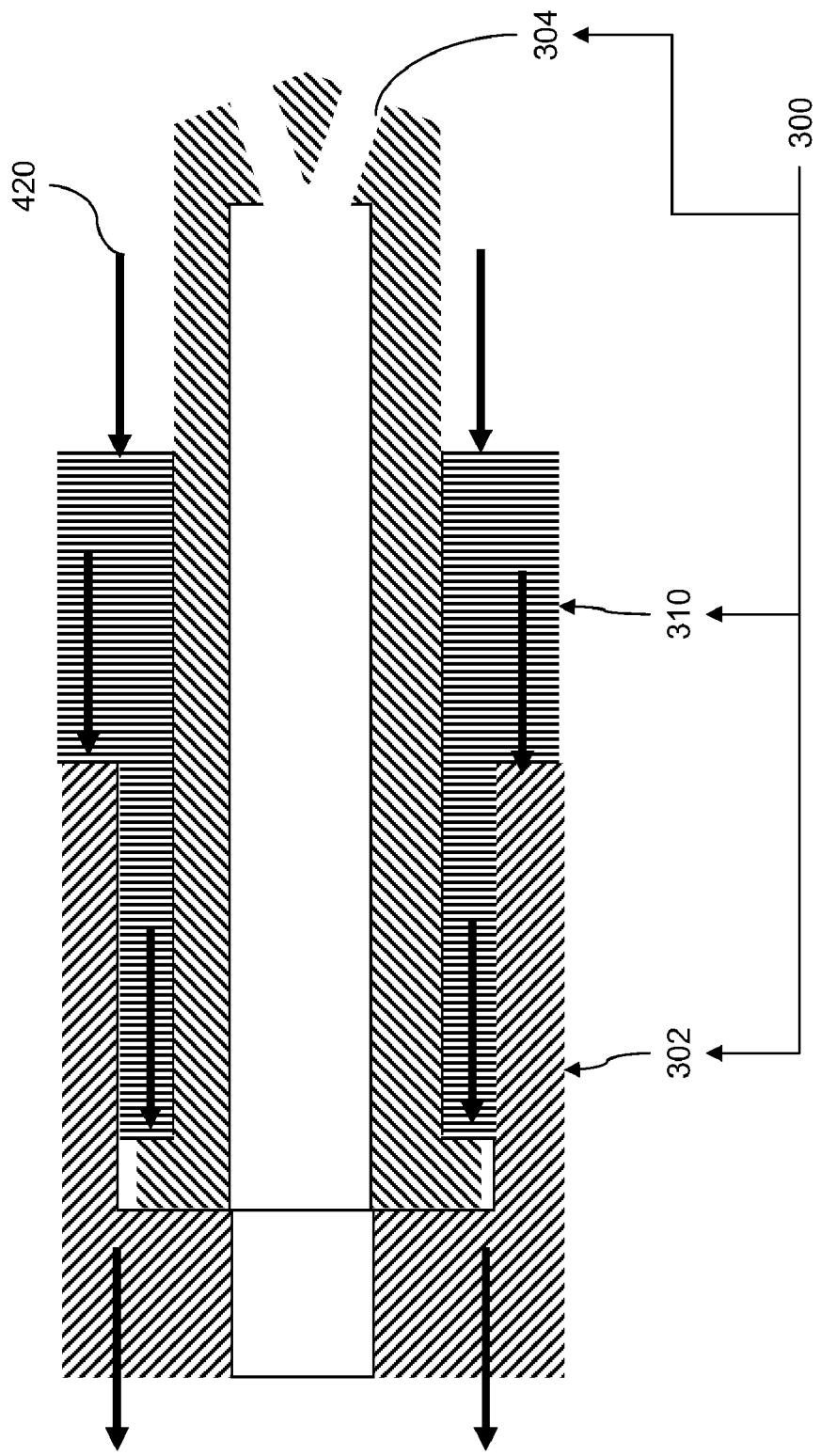

FIG. 1G depicts the case where in the third position, the tip retainer (310) is further configured to transfer an injection force (420) (also called in injection pressure) to the inlet portion (306) of the nozzle tip (304) and to the nozzle housing (302). The injection force (420) is transferred between the tip retainer (310) and the nozzle housing (302) along two transmission paths. The majority of the injection force (420) is transmitted along the nozzle housing (302).

FIGS. 2A, 2B, 2C, 2D depict several examples of an injection nozzle assembly (300).

Figures 2A, 2B:
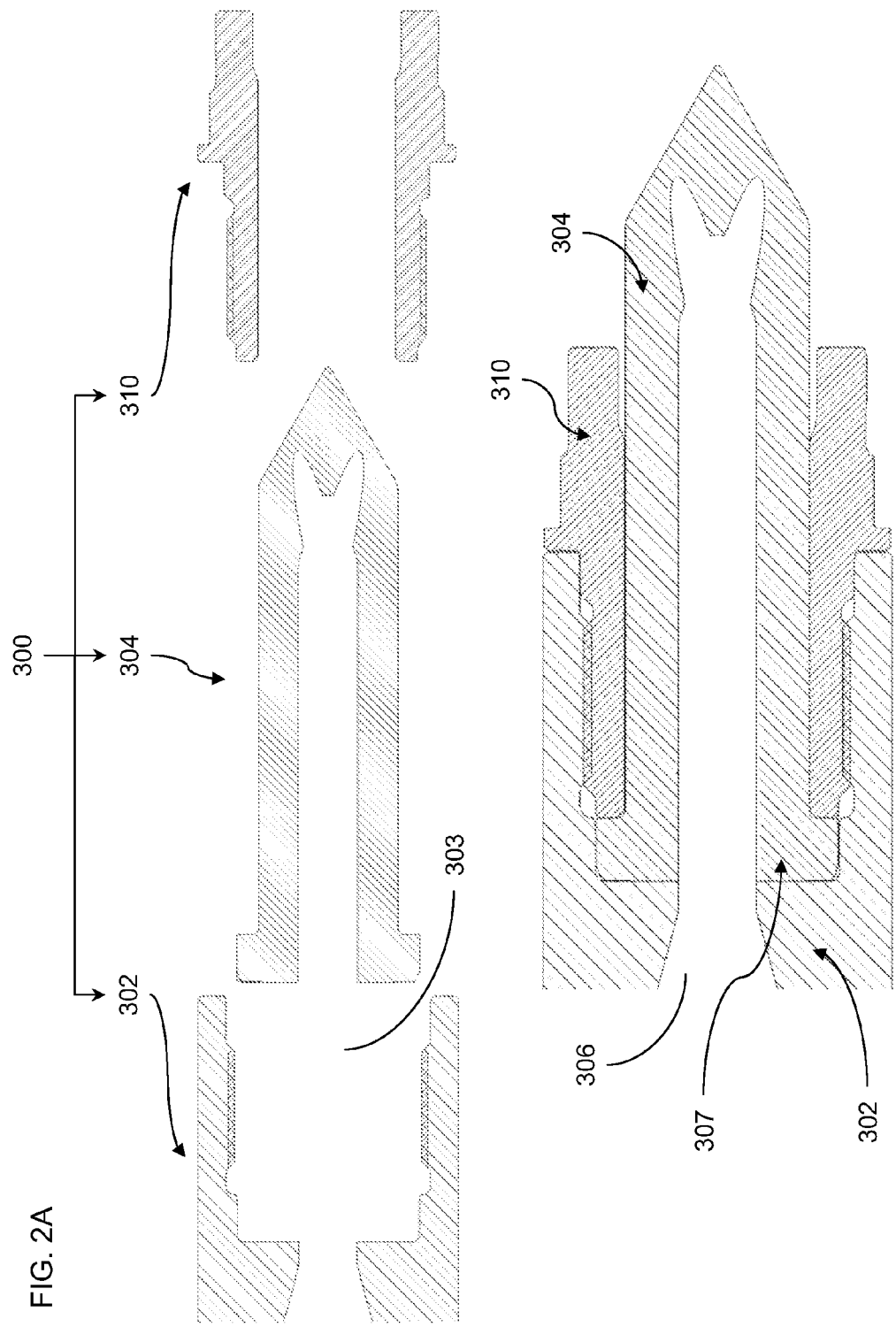
FIGS. 2A, 2B, 2C, 2D depict several examples of an injection nozzle assembly.

FIG. 2A depicts an exploded (cross-sectional) view of another example of the injection nozzle assembly (300), which are further described below in more detail.

FIG. 2B depicts an assembled (cross-sectional) view of another example of the injection nozzle assembly (300) of FIG. 2A.

Figure 2C:
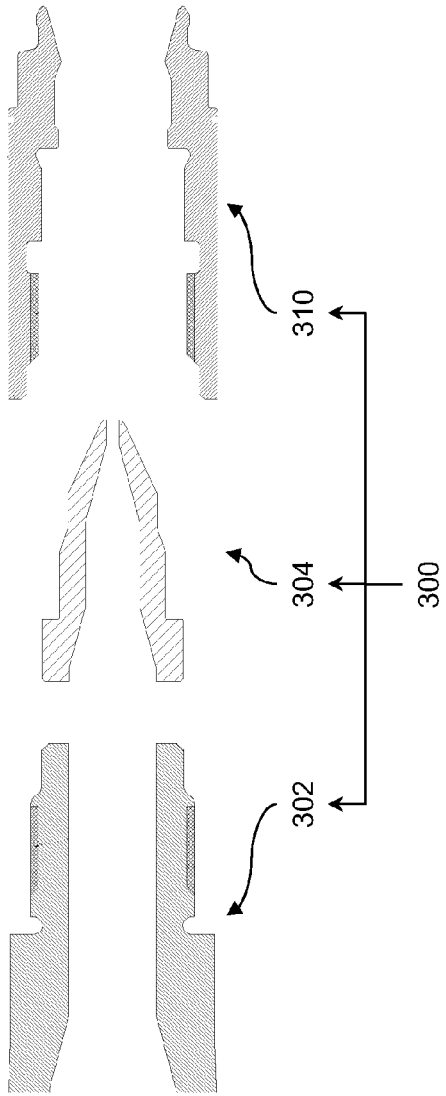

FIG. 2C depicts an exploded (cross-sectional) view of yet another example of the injection nozzle assembly (300), which are further described below in more detail.

Figure 2D:
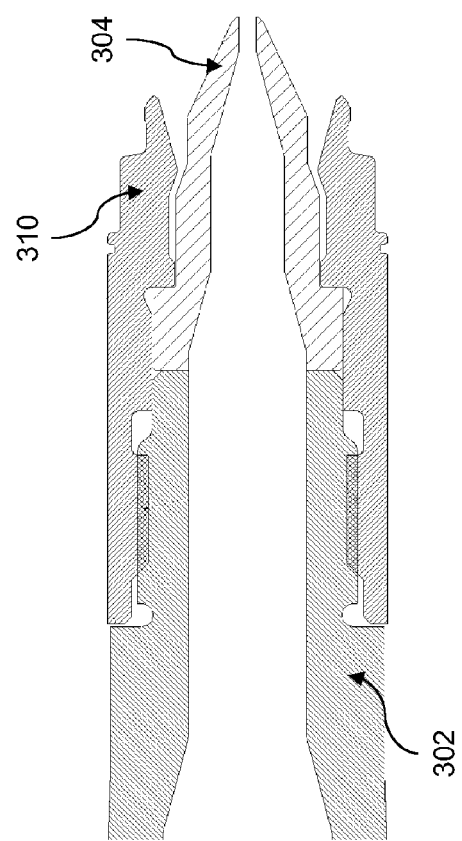

FIG. 2D depicts an assembled (cross-sectional) view of yet another example of the injection nozzle assembly (300) of FIG. 2C.

According to one embodiment, the present disclosure may feature an injection molding nozzle 100, as depicted in FIGS. 3-6, which may include a nozzle housing 112, a tip insert 116 that may be secured relative to the nozzle housing 112 by a tip retainer 124, and a pre-load limiter gap 170 between the nozzle housing 112 and the tip retainer 124. As will be explained in greater detail hereinbelow, the pre-load limiter gap 170 may allow for a desired amount of pre-load force/torque P to be applied to the tip insert 116 and/or substantially prevent, reduce, and/or limit additional, excessive force from being transmitted against the tip insert 116.

The injection molding nozzle 100 may include a nozzle housing 112 configured to be secured to a source of pressurized molten material (not shown) and a melt channel 114 therethrough that may be in fluid communication with the source of pressurized molten material in any manner known to those skilled in the art. A tip insert 116 may be installed about the proximal end 118 of the nozzle housing 112 so that a tip channel 122 formed in tip insert 116 may be in fluid communication with the melt channel 114. The tip channel 122 may also include at least one outlet aperture 120 in fluid communication with tip channel 122.

The injection molding nozzle 100 may also include a tip retainer 124 configured to receive and retain the tip insert 116 relative to the nozzle housing 112 when tip retainer 124 is secured to the proximal end 118 of nozzle housing 112. The tip retainer 124 may be removably affixed to the proximal end 118 of the nozzle housing 112 by way of threads 126 that threadably engage with corresponding threads 127 on the nozzle housing 112 or any to functional equivalents thereof. As the tip retainer 124 is screwed onto the proximal end 118 of the nozzle housing 112, a flange engagement portion 151 of the tip retainer 124 may generally apply a force/torque against at least a portion of a tip insert flange 150 extending radially from the tip insert 116. The force applied against the tip insert 116 (and specifically the tip insert flange 150) urges the insert seal portion 153 of the tip insert 116 against the is nozzle seal engagement portion 154 of the nozzle housing 112 to form a seal 156 between the tip insert 116 and the nozzle housing 112.

While not a limitation of the present disclosure unless specifically claimed as such, the tip insert 116 may be constructed from a material having a high thermal conductivity (such as, but not limited to, a copper alloy or the like). In contrast, the nozzle housing 112 and/or the tip retainer 124 may be constructed from a material having a lower thermal conductivity but a higher strength compared to the tip insert 116. As such, the tip insert 116 (and specifically the tip insert flange 150) is particularly susceptible to damage due to excessive force (particularly excessive compressive force).

As mentioned above, the injection molding nozzle 100 according to the present disclosure may also feature a pre-load limiter gap 170 between the nozzle housing 112 and the tip retainer 124. As will be explained in greater detail hereinbelow, by setting the dimensions and tolerances of the nozzle housing 112, tip insert 116, and the tip retainer 124, the pre-load limiter gap 170 may allow for a predefined amount of pre-load force/torque P to be applied to the tip insert 116 (and specifically the tip insert flange 150) to create the seal 156 and/or substantially prevent, reduce, and/or limit additional, excessive force from being transmitted against the tip insert 116.

As used herein, the term "pre-load force/torque P" is intended to mean a desired amount of force/torque between the tip insert 116, tip retainer 124 and the nozzle housing 112 that will create seal 156 (that is satisfactory and reliable) between the tip insert 116 and the nozzle housing 112 without causing damage to the injection molding nozzle 100. The term "excessive force" as used herein is intended to mean a force between the tip insert 116 and the nozzle housing 112 in excess of a predefined limit/threshold above the pre-load force/torque P. The pre-load force/torque P and force threshold are considered within the knowledge of one of ordinary skill in the art and may be determined experimentally or through finite element analysis and will vary depending upon the intended application. For exemplary purposes only, the pre-load torque may be between approximately 30 ft-lb to approximately 35 ft-lb and the predefined limit/threshold may be between approximately 0.03 mm (millimeters) to approximately 0.035 mm.

Figure 3:
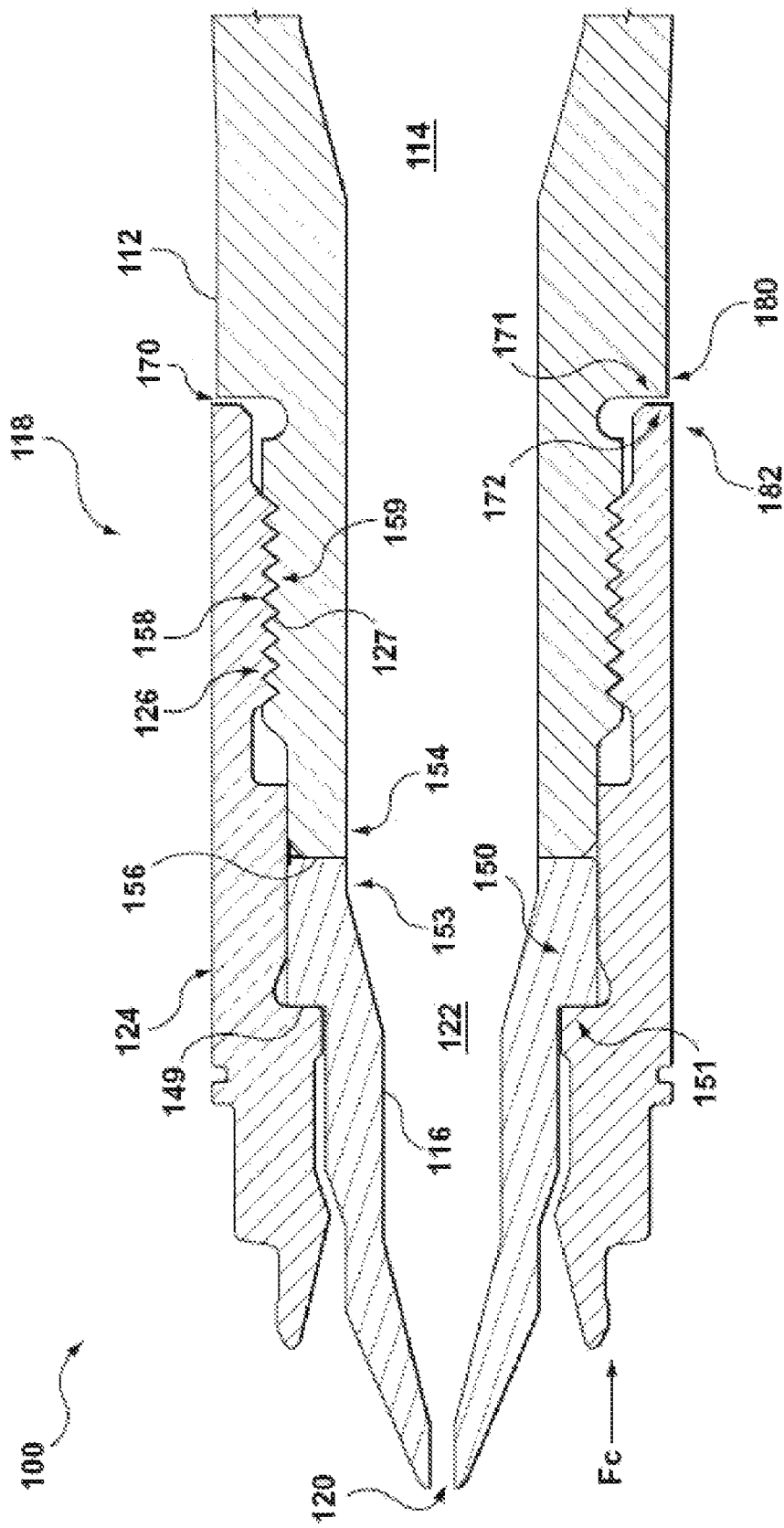
FIG. 3 is a cross-sectional view of one embodiment of a nozzle having a pre-load limiter gap according to the present disclosure shown in a partially assembled position.
Figure 4:
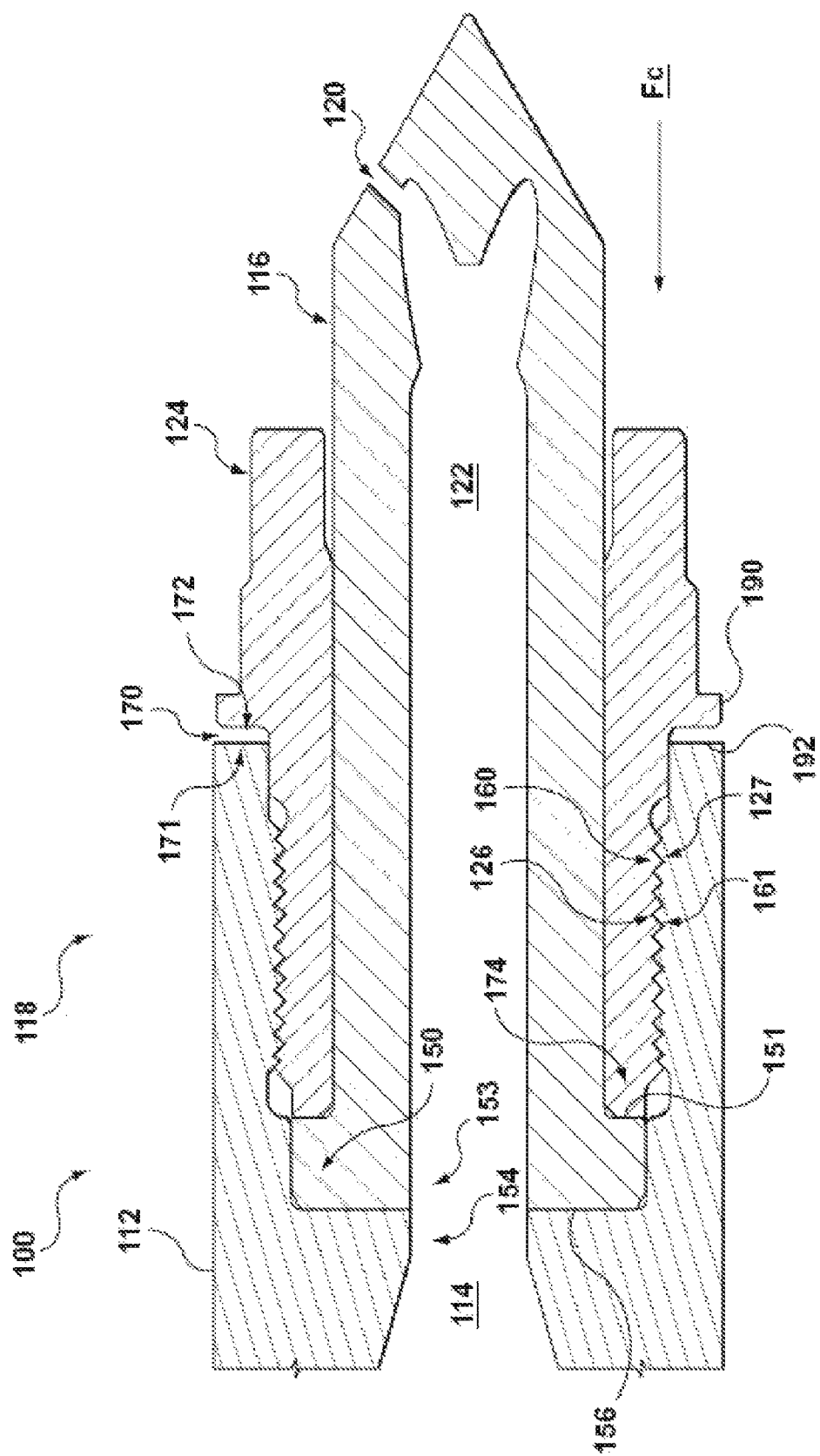
FIG. 4 is a cross-sectional view of another embodiment of a nozzle having a pre-load limiter gap according to the present disclosure shown in a partially assembled position.
Figure 5:
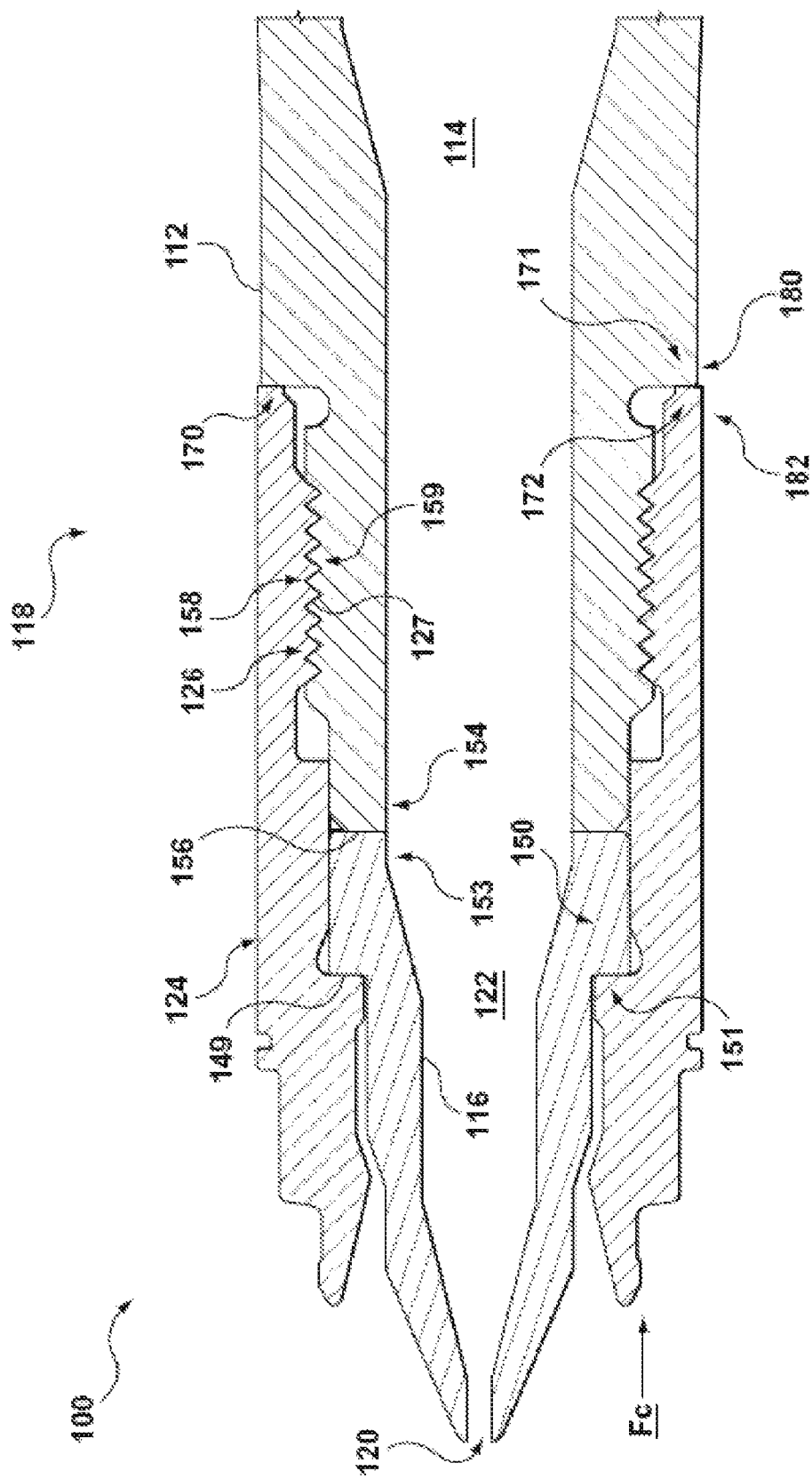
FIG. 5 is a cross-sectional view of the nozzle shown in FIG. 3 in a fully assembled position.
Figure 6:
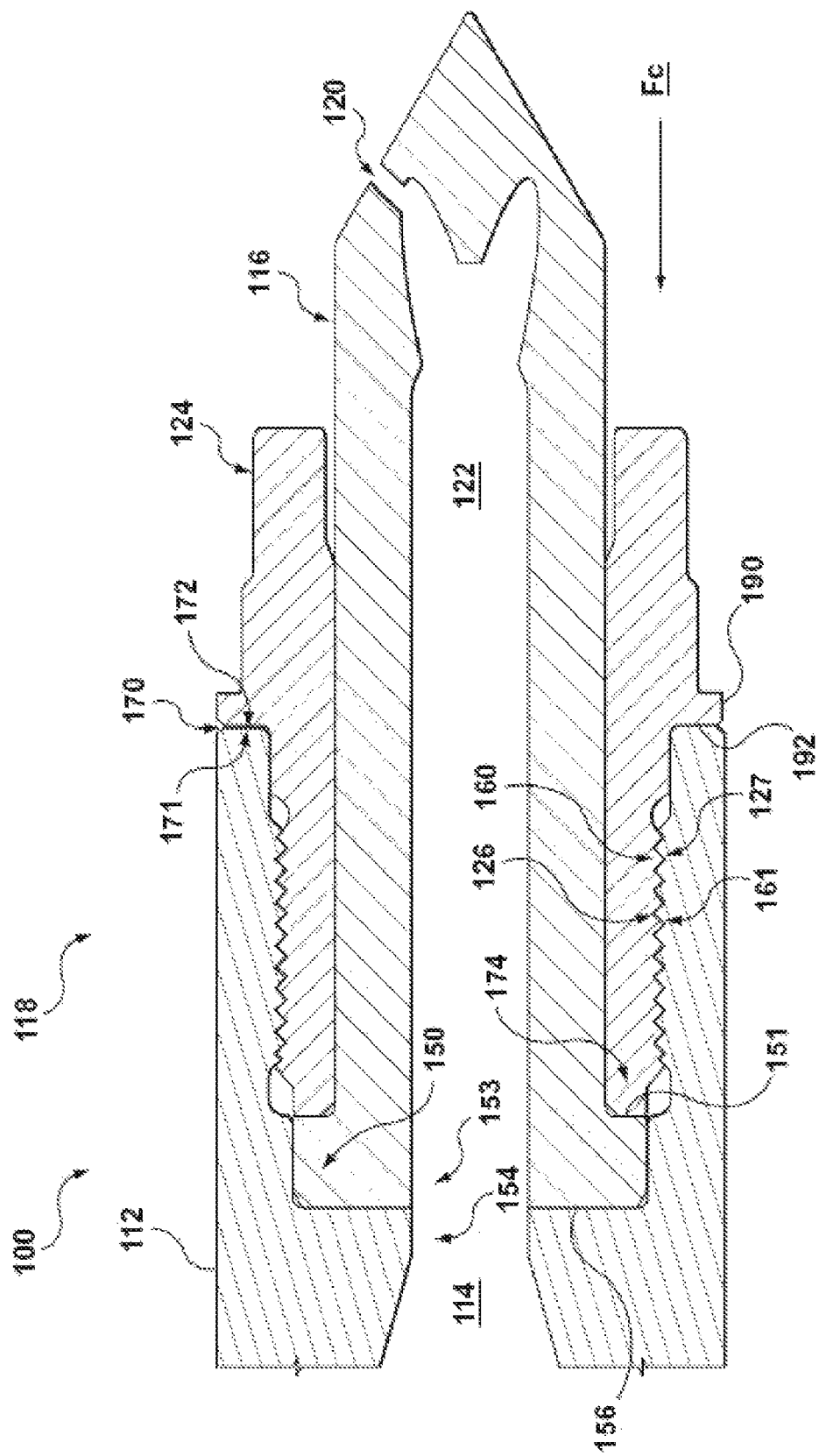
FIG. 6 is a cross-sectional view of the nozzle shown in FIG. 4 in a fully assembled position.

The pre-load limiter gap 170 may be defined as the distance between the first pre-load engagement surface 171 and the second pre-load engagement surface 172 of the nozzle housing 112 and the tip retainer 124 in a partially assembled position (wherein the tip insert flange 150 is initially substantially contacting/abutting both the flange engagement portion 151 of the tip retainer 124 and the nozzle seal engagement portion 154 of the nozzle housing 112 as shown in FIGS. 3 and 4) and a fully-assembled position (wherein the first pre-load engagement surface 171 and the second pre-load engagement surface 172 of the nozzle housing and the tip retainer 124 substantially abut against each other as shown in FIGS. 5 and 6) that will create the desired amount of pre-load force P. While not a limitation of the present disclosure unless specifically claimed as such, the pre-load limiter gap 170 may be between approximately 0.03 to approximately 0.08 mm. Such a pre-load limiter gap 170 may result in a pre-load torque P of approximately 30 ft-lb depending on the materials chosen.

According to one embodiment of the injection molding nozzle 100 shown in FIGS. 3 and 5, the tip retainer 124 may include threads 126 (i.e., internal threads) disposed about a surface 158 of the tip retainer 124 generally facing radially towards the melt channel 114) which may engage with threads 127 (i.e. external threads) on the nozzle housing 112 (i.e., threads 127 disposed about a surface 159 of the nozzle housing 112 generally facing radially away from the melt channel 114). The flange engagement portion 151 of the tip retainer 124 may include an annular lip 149 extending generally radially inwardly towards the melt channel 114 and the tip channel 122 which may be sized and shaped to substantially abut against or engage at least a portion of the tip insert flange 150 as the tip retainer 124 is threaded onto the nozzle housing 112. Additionally, the first pre-load engagement surface 171 of the nozzle housing 112 may include a generally annular stop flange 180 extending generally radially outwardly while the second pre-load engagement surface 172 of the tip retainer 124 may include a distal end portion 182 of the tip retainer 124.

Referring specifically to FIG. 3, the injection molding nozzle 100 is shown in the first, partially assembled position wherein the tip retainer 124 has been threaded onto the nozzle housing 112 until the tip insert flange 150 initially substantially contacts/abuts both the annular lip 149 of the tip retainer 124 and the nozzle seal engagement portion 154 of the nozzle housing 112. As can be seen, there is a gap or space between the annular stop flange 180 of the to nozzle housing 112 and the distal end portion 182 of the tip retainer 124.

Referring now to FIG. 5, the injection molding nozzle 100 is shown in the fully-assembled position. In particular, the tip retainer 124 has been threaded onto the nozzle housing 112 until the distal end portion 182 of the tip retainer 124 substantially abuts against/contacts the annular stop flange 180 of the nozzle housing 112. As can be seen, the gap or space between the annular stop flange 180 of the nozzle housing 112 and the distal end portion 182 of the tip retainer 124 has been closed. When in the second position, the tip retainer 124 transfers a pre-load force/torque P against the tip insert 116 (and in particular, the tip insert flange 150) which creates the seal 156 between the tip insert 116 and the nozzle housing 112.

The pre-load limiter gap 170 may therefore defined as the distance between the annular stop flange 180 and the distal end portion 182 in the first, partially assembled position (as shown in FIG. 3) and the fully assembled position (as shown in FIG. 5) which will result in the tip retainer 124 transferring a force against the tip insert that is approximately equal to the desired amount of pre-load force/torque.

As can be seen, once the injection molding nozzle 100 is in the second position as shown in FIG. 5, the annular stop flange 180 substantially prevents the tip retainer 124 from being threaded onto the nozzle housing 112 any further. Because the nozzle housing 112 and the tip retainer 124 may be constructed from a generally strong material (such, but not limited to, steel or the like), the nozzle housing 112 and the tip retainer 124 have a relatively low amount of deformability compared to the tip insert 116 (which may be constructed from a relatively weaker, more deformable material such as, but not limited to, copper alloys and the like). As a result, any excessive force due to accidental over-tightening of the tip retainer 124 (e.g., resulting from operator error, torque wrench error, or the like) as well as the injection back load injection force $F_C$ transmitted through the tip retainer 124 or the like may be transmitted through the tip retainer 124 to the nozzle housing 112 instead of the tip insert flange 150.

According to another embodiment of the injection molding nozzle 100 shown in shown in FIGS. 4 and 6, the tip retainer 124 may include threads 126 (i.e., external threads) disposed about a surface 160 of the tip retainer 124 generally facing radially away from the melt channel 114) which may engage with threads 127 (internal threads) on the nozzle housing 112 (i.e., threads 127 disposed about a surface 161 of the nozzle housing 112 generally facing radially towards the melt channel 114). The flange engagement portion 151 of the tip retainer 124 may include a distal end portion 174 which may substantially abut against or engage at least a portion of the tip insert flange 150 as the tip retainer 124 is threaded onto the nozzle housing 112. Additionally, the second pre-load engagement surface 172 of the tip retainer 124 may include a generally annular stop flange 190 extending generally radially outwardly while the first pre-load engagement surface 171 of the nozzle housing 112 may include a proximate end portion 192 of the nozzle housing 112.

Referring specifically to FIG. 4, the injection molding nozzle 100 is shown in the first, partially assembled position wherein the tip retainer 124 has been threaded onto the nozzle housing 112 until the tip insert flange 150 initially substantially contacts/abuts both the distal end portion 174 of the tip retainer 124 and the nozzle seal engagement portion 154 of the nozzle housing 112. As can be seen, there is a gap or space between the annular stop flange 190 of the tip retainer 124 and the proximate end portion 192 of the nozzle housing 112.

Referring now to FIG. 6, the injection molding nozzle 100 is shown in the fully assembled position. In particular, the tip retainer 124 has been threaded onto the nozzle housing 112 until the annular stop flange 190 of the tip retainer 124 substantially abuts against/contacts the proximate end portion 192 of the nozzle housing 112. When in this position, the tip retainer 124 may transfer a pre-load force/torque against the tip insert 116 (and in particular, the tip insert flange 150) which creates the seal 156 between the tip insert 116 and the nozzle housing 112.

The pre-load limiter gap 170 may therefore be defined as the distance between the annular stop flange 190 and the proximate end portion 192 in the first, partially assembled position (as shown in FIG. 4) and the fully assembled position (as shown in FIG. 6) which will result in the tip retainer 124 transferring a force against the tip insert that is approximately equal to the desired amount of pre-load force.

As can be seen, once the injection molding nozzle 100 is in the fully assembled position as shown in FIG. 6, the annular stop flange 190 substantially prevents the tip retainer 124 from being threaded onto the nozzle housing 112 any further. Because the nozzle housing 112 and the tip retainer 124 may be constructed from a generally strong material (such, but not limited to, steel or the like), the nozzle housing 112 and the tip retainer 124 have a relatively low amount of deformability compared to the tip insert 116 (which may be constructed from a relatively weaker, more deformable material such as, but not limited to, copper alloys and the like). As a result, any excessive force due to accidental over-tightening of the tip retainer 124 (e.g., resulting from operator error, torque wrench error, or the like) as well as the injection back load injection force $F_C$ transmitted through the tip retainer 124 or the like may be transmitted through the tip retainer 124 to the nozzle housing 112 instead of the tip insert flange 150.

Figure 9A:
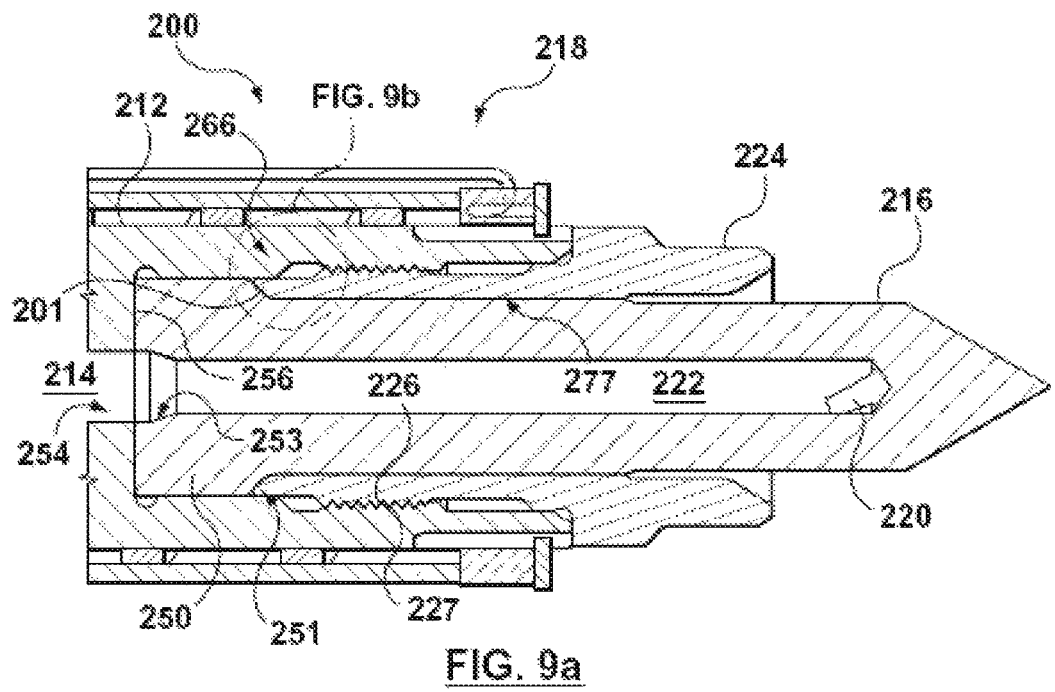
FIG. 9a is a cross-sectional view of another embodiment of a nozzle according to the present disclosure comprising a tapered interface having both a non-linear, arcuate, or radiused shaped interface and a linear or constant frustoconical shaped interface.

According to yet another embodiment, the present disclosure may feature a nozzle 200, FIGS. 7-9 (only half of which is shown for clarity), including a nozzle housing 212, a tip insert 216, a tip retainer 224, and a tapered interface 201 (tapered flange interface) between the tip insert 216 and the tip retainer 224. As will be described in greater detail hereinbelow, the tapered interface 201 (tapered flange interface) may reduce the stress concentration between the tip insert 216 and the tip retainer 224 and may improve the seal 256 between the nozzle housing 212 and the tip insert 216. While not a limitation of the present disclosure unless specifically claimed as such, those skilled in the art will recognize that the tapered interface 201 may be combined with any embodiment of the pre-load limiter gap 170 described above in FIGS. 3-6.

The nozzle 200 may include a nozzle housing 212 (elongated nozzle housing) configured to be secured to a source of pressurized molten material (not shown) and may include a melt channel 214 therethrough that may be in fluid communication with the source of pressurized molten material in any manner known to those skilled in the art. The tip insert 216 may be installed about the proximal end 218 of the nozzle housing 212 so that a tip channel 222 formed in tip insert 216 may be in fluid communication with the melt channel 214. The melt channel 214 may also include at least one outlet aperture 220 in fluid communication with tip channel 222.

The nozzle 200 may further include a tip retainer 224 configured to receive and retain the tip insert 216 relative to the nozzle housing 212 when tip retainer 224 is disposed about a proximal end 218 of nozzle housing 212. The tip retainer 224 may be removably affixed to the proximal end 218 of the nozzle housing 212 by way of threads 226 that threadably engage with corresponding threads 227 on the nozzle housing 212 or any functional equivalents thereof. As the tip retainer 224 is screwed onto the proximal end 218 of the nozzle housing 212, a flange engagement portion 251 of the tip retainer 224 may apply a to force/torque against at least a portion of the engagement surface 249 of a tip insert flange 250 extending radially from the tip insert 216. The force applied against the tip insert 216 (and specifically the tip insert flange 250) urges the insert seal portion 253 of the tip insert 216 against the nozzle seal portion 254 of the nozzle housing 212 to form a seal 256 between the tip insert 216 and the nozzle housing 212.

For example, the nozzle 200, FIG. 7, may include a tip retainer 224 having threads 226 (i.e., internal threads) disposed about a surface 258 of the tip retainer 224 generally facing radially towards the melt channel 214) which may engage with threads 227 (i.e. external threads) on the nozzle housing 212 (i.e., threads 227 disposed about a surface 259 of the nozzle housing 212 generally facing radially away from the melt channel 214). The flange engagement portion 251 of the tip retainer 224 may include an annular lip 255 extending generally radially inwardly from the tip retainer 224 towards the melt channel 214 and the tip channel 222 which may be sized and shaped to substantially abut against or engage at least a portion of the engagement surface 249 tip insert flange 250 as the tip retainer 224 is threaded onto the nozzle housing 212.

According to another embodiment, the nozzle 200, FIGS. 8 and 9, may include a tip retainer 224 having threads 226 (i.e., external threads) disposed about a surface 260 of the tip retainer 224 generally facing radially away from the melt channel 214) which may engage with threads 227 (internal threads) on the nozzle housing 212 (i.e., threads 227 disposed about a surface 261 of the nozzle housing 212 generally facing radially towards the melt channel 214). The flange engagement portion 251 of the tip retainer 224 may include a distal end portion 274 that may substantially abut against or engage at least a portion of the engagement surface 249 of the tip insert flange 250 as the tip retainer 224 is threaded onto the nozzle housing 212.

According to one embodiment, the nozzle housing 212 may have a portion 266 (best seen in FIG. 9b) which has an inner diameter sized and shaped to substantially abut against the distal end portion 274 of the flange engagement portion 251 of the tip retainer 224. A spacing (not shown) may be provided between the portion 266 of the nozzle housing 212 and the distal end portion 274 of the tip retainer 224 to allow for thermal expansion or the like. As may be appreciated, the portion 266 of the nozzle housing 212 may support the distal end portion 274 of the tip retainer 224, thereby substantially preventing the distal end portion 274 of the tip retainer 224 from bending radially outwardly when under torque.

In either of the embodiments described in FIGS. 7-9, the tip retainer 224 may apply a force against the tip insert 216 to create the seal 256 between the nozzle housing 212 and the tip insert 216. The force applied by the tip retainer 224 should be sufficient enough to substantially prevent leakage of resin from the melt channel 214 and the tip channel 222. The tip retainer 224 may also transfer additional forces against the tip insert flange 250 due to over-tightening of the of the tip retainer 224 and/or injection back load force $F_C$ applied to the tip retainer 224 under normal operating conditions of the injection molding machine. Regardless of the origin or source of the force applied against the tip insert 216, the tip insert 216 (and in particular, the tip insert flange 250) may be damaged if the force stress concentration between the tip retainer 224 and the tip insert flange 250 exceeds the yield strength limit of the material of the tip insert flange 250.

Referring back to FIGS. 7-9, the nozzle 200 according to the present disclosure may include a tapered interface 201 between the flange engagement portion 251 and the engagement surface 249 of the tip insert flange 250. As will be discussed in greater detail hereinbelow, the tapered interface 201 between the tip insert 216 and the tip retainer 224 may reduce the force concentration applied to the tip insert 216, thereby reducing the likelihood of damaging the tip insert 216. The tapered interface 201 may reduce the contact pressure (yielding) and increase the fatigue endurance limit of the tip insert 216. The tapered interface 201 may also improve the seal 256 between the nozzle housing 212 and the tip insert 216 by distributing the force applied to the tip insert 216 more evenly across the seal 256.

As shown in FIGS. 7a and 8a, the tapered interface 201 may include a substantially linear or constant frustoconical shape. As used herein, a tapered interface 201 (linear or constant frustoconical shaped) is intended to mean that the flange engagement portion 251 and the engagement surface 249 of the tip insert flange 250 have generally constant sloped outer surfaces that are not perpendicular to each other. The slope or angle of the tapered interface 201 (substantially linear or constant frustoconical shaped) may depend upon intended application of the nozzle 200 and may be determined experimentally or through finite element analysis. While not a limitation of the present disclosure unless specifically claimed as such, the angle of the tapered interface 201 (the substantially linear or constant frustoconical shaped) may range between approximately 25 to approximately 35 degrees from the longitudinal axis of the nozzle 200.

According to another embodiment, the tapered interface 201, FIGS. 7b and 8b, may include a substantially non-linear, arcuate, or radiused frustoconical shape. As used herein, a tapered interface 201 (non-linear, arcuate, or radiused shaped frustoconical) is intended to mean that the flange engagement portion 251 and the engagement surface 249 of the tip insert flange 250 have an arc or curved outer surface that changes along the length of the tapered interface 201 (frustoconical). The tapered interface 201 (non-linear, arcuate, or radiused frustoconical) may include convex and/or concaved surfaces. The exact shape of the tapered interface 201 (non-linear, arcuate, or radiused frustoconical) may depend upon intended application of the nozzle 200 and may be determined experimentally or through finite element analysis. While not a limitation of the present disclosure unless specifically claimed as such, the tapered interface 201 (non-linear, arcuate, or radiused frustoconical) may include a generally radiused shape having a radius between approximately 0.8 mm to approximately 1.8 mm.

Figure 9B:
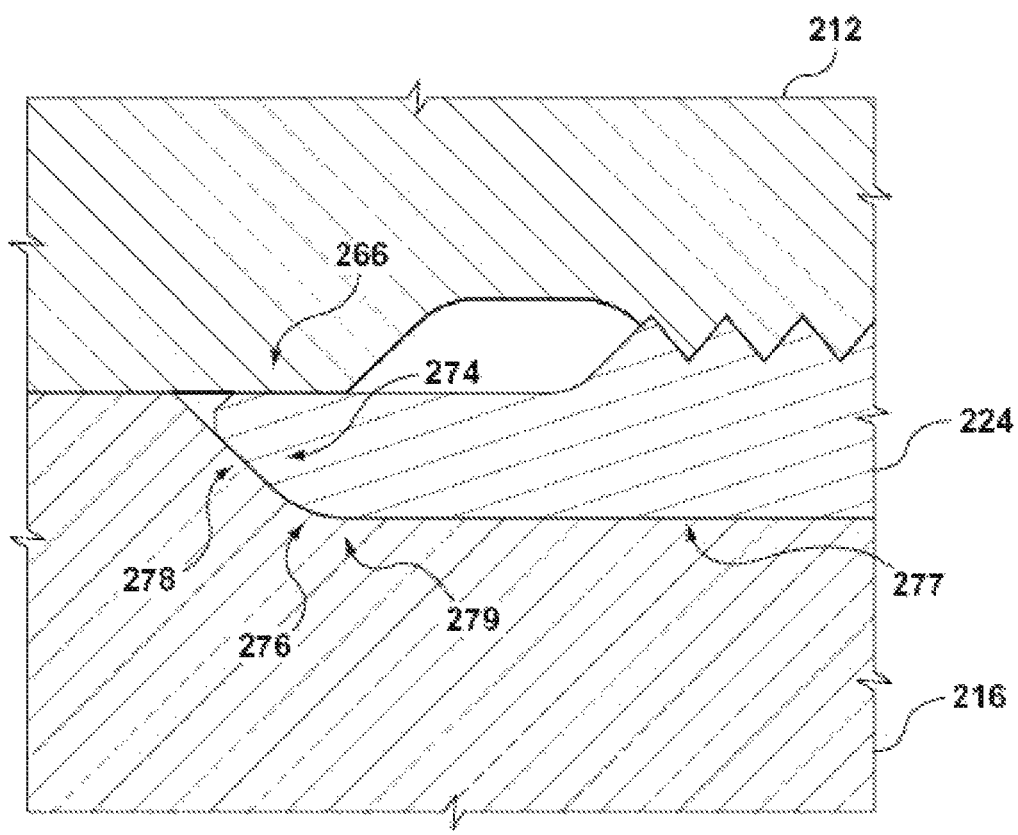

According to yet another embodiment, the tapered interface 201, FIG. 9, may include a first region 276 having a substantially non-linear, arcuate, or radiused frustoconical shape and a second region 278 having a substantially linear or constant frustoconical shape. Referring specifically to FIG. 9b, the first region 276 of the tapered interface 201 may be disposed proximate a transition region 279 between the elongated portion 277 of the tip insert 216 and tip retainer 224 and the tapered interface 201 (tapered) and may transition into the second region 278. The first region 276 (non-linear, arcuate, or radiused frustoconical interface) may increase the surface area proximate the transition region 279 and therefore reduce the stress concentration proximate the transition region 279. Reducing the stress concentration proximate the transition region 279 may be particularly beneficial since the transition region 279 may exposed to the highest stress concentration and therefore may be most likely to suffer from damage. The use of the second region 278 (substantially linear or constant frustoconical) may further increase the surface area while also facilitating the manufacturing of the tip insert 216 and the tip retainer 224. While the first region 276 and the second region 278 are shown with a nozzle 200 having the tip retainer 224 that is externally threaded, the first region 276 and the second region 278 may also be combined with a nozzle 200 having the tip retainer 224 that is internally threaded as shown in FIG. 7.

As mentioned above, the tapered interface 201, FIGS. 7-9, may increase the surface contact area between the flange engagement portion 251 of the tip retainer 224 and the engagement surface 249 of the tip insert flange 250 in comparison to nozzle designs wherein the tip insert to flange and the tip retainer abut along a generally perpendicularly interface or shoulder. As a result, the stress concentration and pressure along the tapered interface 201 (and, in particular, the tip insert flange 250) may be decreased and the lifespan of the tip insert flange 250 may therefore be increased. It should be noted that the tapered interface 201 (non-linear, arcuate, or radiused shaped) as shown in FIGS. 7b, 8b, and 9 may provide an additional benefit over the tapered interface 201 (linear or constant) shown in FIGS. 7a and 8a since the surface area between the flange engagement portion 251 of the tip retainer 224 and the engagement surface 249 of the tip insert flange 250 is further increased.

Additionally, the tapered interface 201 according to the present disclosure may provide the seal 256 between the nozzle housing 212 and the tip insert 216. In particular, the tapered interface 201 may distribute the force transmitted by the tip retainer 224 both along the longitudinal axis of the nozzle 200 as well as along the radial axis of the nozzle 200. Consequently, the tapered interface 201 may transfer more force towards the portion of seal 256 closest to the melt channel 214 and the tip channel 222. Moreover, this longitudinal and radial distribution of force further reduces the stress concentration experienced between the tip insert flange 250 and the nozzle housing 212.

As mentioned above, the present disclosure is not intended to be limited to a system or method which must satisfy one or more of any stated or implied object or feature of the invention and should not be limited to the preferred, exemplary, or primary embodiment(s) described herein. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention.

What is claimed is:

1. An injection nozzle assembly, comprising:
   a nozzle housing;
   a nozzle tip having an inlet portion and an outlet portion, said inlet portion being in direct contact with the nozzle housing; and
   a tip retainer being movable relative to the nozzle housing between a first position, a second position and a third position while the inlet portion is in said direct contact with the nozzle housing
   wherein in the first position, the tip retainer is in direct contact with the nozzle tip, and a gap exists between a distal end of the tip retainer and the nozzle housing.

2. The injection nozzle assembly of claim 1, wherein:
   in the second position,
      the tip retainer contacts the nozzle housing so as to close said gap without transmission of force from the tip retainer to the nozzle housing, and
      the tip retainer is forcefully connected with the inlet portion of the nozzle tip via a first force-transmission path, and in response, a pre-load force becomes transmitted from the tip retainer to the inlet portion.

3. The injection nozzle assembly of claim 2, wherein:
   in the second position,
      the amount of the pre-load force applied from the tip retainer to the inlet portion seals the inlet portion with the nozzle housing.

4. The injection nozzle assembly of claim 3, wherein:
   in the third position,
      the tip retainer is forcefully connected with the inlet portion of the nozzle tip via the first force-transmission path, and
      the tip retainer is forcefully connected with the nozzle housing via a second force-transmission path, and
      in response the pre-load force becomes sharable transmitted from the tip retainer to the inlet portion and to the nozzle housing via the first force-transmission path and the second force-transmission path.

5. The injection nozzle assembly of claim 4, wherein:
   in the third position,
      the tip retainer is further configured to transfer an injection force to the inlet portion of the nozzle tip and to the nozzle housing.

* * * * *